United States Patent
Meyer-Hilberg et al.

(10) Patent No.: US 6,563,455 B2
(45) Date of Patent: May 13, 2003

(54) UNIVERSAL TWO-CHANNEL STAP FILTER

(75) Inventors: Jochen Meyer-Hilberg, Elchingen (DE); Bernhard Bickert, Ulm (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/910,002

(22) Filed: Jul. 23, 2001

(65) Prior Publication Data

US 2002/0044083 A1 Apr. 18, 2002

(30) Foreign Application Priority Data

Jul. 21, 2000 (DE) .......................... 100 35 530

(51) Int. Cl.[7] .............................................. G01S 7/288
(52) U.S. Cl. ..................... 342/175; 342/145; 342/189; 342/194; 342/378; 342/380
(58) Field of Search ......................... 342/378, 380–384, 342/145, 168, 175, 189, 194

(56) References Cited

U.S. PATENT DOCUMENTS

| | | | | |
|---|---|---|---|---|
| 4,169,245 A | * | 9/1979 | Crom et al. | 324/76.33 |
| 5,175,558 A | * | 12/1992 | DuPree | 342/378 |
| 5,499,030 A | * | 3/1996 | Wicks et al. | 342/159 |
| 5,874,916 A | * | 2/1999 | Desjardins | 342/378 |
| 6,252,540 B1 | * | 6/2001 | Hale et al. | 342/159 |
| 6,304,515 B1 | * | 10/2001 | Spiesberger | 342/378 |
| 6,400,306 B1 | * | 6/2002 | Nohara et al. | 342/160 |

* cited by examiner

*Primary Examiner*—Thomas H. Tarcza
*Assistant Examiner*—Isam Alsomiri
(74) *Attorney, Agent, or Firm*—Crowell & Moring LLP

(57) ABSTRACT

To suppress interfering stationary targets in radar source data, a STAP filtering method is used. Filtering coefficients are determined, and filtering of the data takes place, in the frequency domain; the process is therefore limited to a few computing operations per matrix element of the range/Doppler matrix. Since, by means of the STAP filter according to the invention, the optimal filtering characteristics can be implemented, the stationary target suppression also functions in the range of the minor lobes of the antenna. Therefore, data of individual adjacent channels (L/R, left/right) can be processed as well as summation and difference signals ($\Sigma/\Delta$).

3 Claims, No Drawings

UNIVERSAL TWO-CHANNEL STAP FILTER

BACKGROUND AND SUMMARY OF THE INVENTION

This application claims the priority of German patent document 100 35 530.7, filed Jul. 21, 2000, the disclosure of which is expressly incorporated by reference herein.

The invention relates to a method for computing the coefficients of a filter and for filtering radar source data of the distance Doppler matrices of two adjacent receiving channels, by means of Space-Time Adaptive Processing.

Radar source data consist of a mixture of signals (for example, echoes of moving and stationary targets) and interferences (for example, noise). As a rule, interference is to be suppressed when evaluating these radar source data, so that the signals can easily be detected.

To improve the detection of moving targets, for example, in synthetic aperture radar ("SAR") images, it is necessary to suppress interference as well as signals which originate from stationary targets. A suitable method for this purpose is the Space-Time Adaptive Processing ("STAP"). In known processes of this type, the radar source data are as a rule filtered in the time domain ("Special Issue on Space-Time Adaptive Processing (STAP)", *Electronics & Communication Engineering Journal*, Volume 11, 1999, February, No. 1, ISSN 0954-0695). Since the determination of the filtering coefficients and filtering in the time domain require high computing expenditures, in practical applications of these methods, the number of filtering coefficients must be relatively limited. This results in a limited filtering quality and thus in a stationary target suppression which is not optimal and which, furthermore, operates satisfactorily only in the range of the major lobe of the antenna.

In German Patent Document DE 100 12 411, which is not prior art, a method is introduced in which the filtering coefficients and the filtering are determined in the frequency domain, so that the number of computing operations per matrix element is limited to a few. In this manner, an optical filtering characteristic is nevertheless implemented, so that the stationary target suppression also functions in the range of the minor lobes of the antenna.

However, the known methods of STAP processing have a common deficiency in that they can either process data of individual adjacent channels or data from sum and difference channels ($\Sigma/\Delta$ data), but not both types of data.

One object of the present invention is to provide a novel method for STAP processing which has an expanded functionality in comparison to known prior art methods.

This and other objects and advantages are achieved by the method according to the invention, with which it is possible, within the scope of a STAP processing, to process data of two-channel systems, which are present either as data of individual channels (L/R, left/right) or as data of sum and difference channels ($\Sigma/\Delta$ data), in the same manner. For this purpose, the computing of the filtering coefficients and the filtering preferably take place in the frequency domain. Advantageously, for determining the filtering coefficients, both the auto-correlations and cross-correlations of the signals of both receiving channels are taken into account.

In an advantageous embodiment of the method according to the invention, filtering in the frequency domain takes place essentially in three steps. In a first step, the auto- and cross-correlations of both input channels are determined, in a very simple manner, using algorithms which are generally known to a person skilled in the art. In the second step, the filtering coefficients $\alpha(i)$ and $\beta(i)$ of the STAP filter are determined; and, subsequently, in a third step, the input signals $\overline{X}_1$ and $\overline{X}_2$ are filtered in the frequency domain in order to arrive at a result matrix $Y_{clutterfree}$ which represents a range/Doppler matrix in which the echoes of stationary targets are contained in a suppressed state and the echoes of moving targets are contained in a coherently intensified state.

A representative embodiment of the method according to the invention which is advantageous for the implementation will be discussed in the following. In this case, $X_1(i,j)$ and $X_2(i,j)$ exist with $1 \leq i \leq N_{DZ}$ and $1 \leq j \leq N_{RG}$, wherein $X_1(i,j)$ is the complex range/Doppler matrix of the first channel (for example, L or $\Sigma$) of a coherent radar system, and $X_2(i,j)$ is the complex range/Doppler matrix of the second channel (for example, R or $\Delta$). Furthermore, $N_{DZ}$ is the number of Doppler cells and $N_{RG}$ is the number of range gates (distance gates). The desired complex range/Doppler matrix to be determined by means of as few computing operations as possible will be $Y_{clutterfree}(i, j)$ In the first step of the method according to the invention, the auto- and cross-relations of both input channels are determined according to Equations 1 to 3. Here, $r_{11}$ indicates the auto-correlation of the first channel; $r_{22}$ indicates the auto-correlation of the second channel, and $r_{12}$ indicates the cross-correlation of both channels.

$$r_{11}(i) = \sum_{j=1}^{N_{RG}} X_1(i,j) \cdot X_1^*(i,j) \qquad \text{Equation 1}$$

$$r_{22}(i) = \sum_{j=1}^{N_{RG}} X_2(i,j) \cdot X_2^*(i,j) \qquad \text{Equation 2}$$

$$r_{12}(i) = \sum_{j=1}^{N_{RG}} X_1(i,j) \cdot X_2^*(i,j) \qquad \text{Equation 3}$$

with $1 \leq i \leq N_{DZ}$.

Advantageously, the values of the auto- or cross-correlations determined from the two input channels may be subjected to an additional processing before the determination of the filtering coefficients $\alpha(i)$ and $\beta(i)$ of the STAP filter.

In this case, it is, for example, advantageous to determine which of the two channels has the better signal-to-noise ratio (S/N). A possible method for this purpose is indicated in Equation 4.

$$\frac{\max(r_{11}(i) \mid 1 \leq i \leq N_{DZ})}{\sum_{i=1}^{N_{DZ}} r_{11}(i)} > \frac{\max(r_{22}(i) \mid 1 \leq i \leq N_{DZ})}{\sum_{i=1}^{N_{DZ}} r_{22}(i)} \qquad \text{Equation 4}$$

If this equation is true, the first channel (corresponding to $\overline{X}_1$ with $r_{11}$) has a better signal-to-noise ratio; otherwise, the second channel (corresponding to $\overline{X}_2$ with $r_{22}$)

Following this determination, advantageously, as a function of which of the two channels $\overline{X}_1$ or $\overline{X}_2$ has a better signal-to-noise ratio (S/N), a defined pair of equations can be used to determine the filtering coefficients $\alpha(i)$ and $\beta(i)$ of the STAP filter. In this case, the selection rule is profitably designed such that, in the event that the channel $\overline{X}_1$ has a better signal-to-noise ratio (S/N), the pair of equations 5 and 6 is selected, but otherwise the pair of equations 7 and 8 is selected.

$$a(i) = -(2l+1) \quad \text{Equation 5}$$

$$b(i) = \sum_{k=N_{DZ}-l}^{N_{DZ}+l} \frac{r_{12}((i+k-1)\bmod N_{DZ}+1)}{r_{22}((i+k-1)\bmod N_{DZ}+1)} \quad \text{Equation 6}$$

for $1 \leq i \leq N_{DZ}$, and $l=0, 1, 2, \ldots$ ;

$$a(i) = \sum_{k=N_{DZ}-l}^{N_{DZ}+l} \frac{r_{12}^*((i+k-1)\bmod N_{DZ}+1)}{r_{11}((i+k-1)\bmod N_{DZ}+1)} \quad \text{Equation 7}$$

$$b(i) = -(2l+1) \quad \text{Equation 8}$$

for $1 \leq i \leq N_{DZ}$, and $l=0, 1, 2, \ldots$ ;

According to Equations 6,7 the mean value of the correlation values of 2l+1, adjacent Doppler cells are used to determine the filtering coefficients a(i), b(i). However, l=0 is also possible, i.e., only the correlation values of one Doppler cell (Doppler cell i) are taken into account.

Advantageously, the method according to the invention can now be modified such that a deviation from the selection rule takes place when the channel with the poorer signal-to-noise ratio S/N) clearly has a lower signal output in comparison to the better channel (for example, at least 20 dB less signal output). As a result, it can be avoided that, because of an extremely low factor in the divisor ($r_{11}$ or $r_{22}$), an unintended elevation of a filtering coefficient (b(i) or a(i)) takes place. In the event of this exception, the respective other pair of equations will be used.

In a particularly advantageous manner, the filtering coefficients can be scaled after their determination. As a result, a homogeneous filtering effect is achievable via all Doppler frequencies. In a particularly advantageous manner, this is possible by means of Equations 9 and 10:

$$\alpha(i) = \frac{a(i)}{\sqrt{a(i) \cdot a^*(i) + b(i) \cdot b^*(i)}} \quad \text{Equation 9}$$

$$\beta(i) = \frac{b(i)}{\sqrt{a(i) \cdot a^*(i) + b(i) \cdot b^*(i)}} \quad \text{Equation 10}$$

with $1 \leq i \leq N_{DZ}$.

In order to save computing performance, it is, however, also possible to eliminate the scaling, and to use the filtering coefficients a (i) or b (i) directly for the filtering coefficients $\alpha(i)$ and $\beta(i)$.

In a final step of the method according to the invention, the filtering coefficients $\alpha(i)$ and $\beta(i)$ are used to process the complex range/Doppler matrices $X_1(i,j)$ and $X_2(i,j)$. As a result, according to Equation 11, the result matrix $Y_{clutterfree}$ is obtained which represents the wanted range/Doppler matrix in which the echoes of stationary targets are suppressed and the echoes of moving targets are contained in a coherently intensified state.

$$Y_{clutterfree}(i,j) = \alpha(i) \cdot X_1(i,j) + \beta(i) \cdot X_2(i,j)$$

with $1 \leq i \leq N_{DZ}$ and $1 \leq j \leq N_{RG}$.

As a result of the method for a STAP processing according to the invention, which, as it were, is capable of processing individual channels (left/right) as well as sum and difference channels, optimal filtering characteristics can be implemented. It is therefore possible to suppress stationary targets also in the range of minor lobes of the antenna.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of filtering radar source data comprising distance Doppler matrices $X_1$ and $X_2$ of two receiving channels, by Space-Time Adaptive Processing (STAP), wherein the data of the distance/Doppler matrices $X_1$ and $X_2$ of individual adjacent channels (left/right) as well as of sum and difference signals ($\Sigma/\Delta$) are processed according to the same procedure, and wherein both computation of filter coefficients $\alpha(i)$ and $\beta(i)$, and filtering take place in the frequency domain, said method comprising:

determining auto-correlations $r_{11}$ and $r_{22}$ and cross-correlations $r_{12}$ of the signals $X_1$ and $X_2$ of both receiving channels, according to the following equations:

$$r_{11}(i) = \sum_{j=1}^{N_{RG}} X_1(i,j) \cdot X_1^*(i,j)$$

$$r_{22}(i) = \sum_{j=1}^{N_{RG}} X_2(i,j) \cdot X_2^*(i,j)$$

$$r_{12}(i) = \sum_{j=1}^{N_{RG}} X_1(i,j) \cdot X_2^*(i,j)$$

wherein $X_1$ (i, j) is a complex range/Doppler matrix of a first of the two channels, $X_2$ (i, j) is a complex range/Doppler matrix of a second of the two channels, $N_{DZ}$ is a number of Doppler cells, $N_{RG}$ is a number of range gates, and $1 \leq i \leq N_{DZ}$;

determining whether the first channel has the better signal-to-noise ratio according to the following condition $$\frac{\max(r_{11}(i) \mid 1 \leq i \leq N_{DZ})}{\sum_{i=1}^{N_{DZ}} r_{11}(i)} > \frac{\max(r_{22}(i) \mid 1 \leq i \leq N_{DZ})}{\sum_{i=1}^{N_{DZ}} r_{22}(i)};$$

applying a selection rule which provides that if the first channel has the better signal-to-noise ratio, the filtering coefficients a (i) and b (i) are determined according to $$a(i) = -(2l+1)$$

$$b(i) = \sum_{k=N_{DZ}-l}^{N_{DZ}+l} \frac{r_{12}((i+k-1)\bmod N_{DZ}+1)}{r_{22}((i+k-1)\bmod N_{DZ}+1)}$$

for $1 \leq i \leq N_{DZ}$, and $l=0, 1, 2$, k being a summation index . . . , and if the first channel does not have the better signal-to-noise ratio, the filtering coefficients a (i) and b (i) are determined according to $$a(i) = \sum_{k=N_{DZ}-l}^{N_{DZ}+l} \frac{r_{12}^*((i+k-1)\bmod N_{DZ}+1)}{r_{11}((i+k-1)\bmod N_{DZ}+1)}$$

$$b(i) = -(2l+1)$$

for $1 \leq i \leq N_{DZ}$, and l=0, 1, 2, k being a summation index . . . ;

scaling the calculated coefficients a (i) and b (i) according $$\alpha(i) = \frac{a(i)}{\sqrt{a(i) \cdot a^*(i) + b(i) \cdot b^*(i)}}$$

$$\beta(i) = \frac{b(i)}{\sqrt{a(i) \cdot a^*(i) + b(i) \cdot b^*(i)}}$$

for $1 \leq i \leq N_{DZ}$; and filtering the signals $X_1$ and $X_2$ in the frequency domain according to $$Y_{clutterfree}(i,j) = \alpha(i) \cdot X_1(i,j) + \beta(i) \cdot X_2(i,j)$$

wherein $1 \leq i \leq N_{DZ}$ and $1 \leq j \leq N_{RG}$ to provide a result matrix $Y_{clutterfree}$ which represents a range/Doppler matrix wherein echoes of stationary targets are suppressed and echoes of moving targets are coherently intensified.

2. The method according to claim 1, wherein a deviation takes place from the selection rule, when the channel with the poorer signal-to-noise ratio (S/N) clearly has less signal output in comparison to the better channel.

3. The method according to claim 1, wherein correlation values of respective adjacent Doppler cells are used to determine a mean.

* * * * *